United States Patent
Wang et al.

(10) Patent No.: US 11,592,718 B2
(45) Date of Patent: Feb. 28, 2023

(54) DISPLAY SUBSTRATE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Chunhua Wang, Beijing (CN); Rui Han, Beijing (CN); Jie Yu, Beijing (CN); Pengtao Li, Beijing (CN); Tielei Zhao, Beijing (CN); Tingfeng Huang, Beijing (CN); Meng Li, Beijing (CN); Shulin Qin, Beijing (CN); Yaoyao Wang, Beijing (CN); Xiaoxia Wang, Beijing (CN); Xiaoqiao Dong, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/351,384

(22) Filed: Jun. 18, 2021

(65) Prior Publication Data
US 2021/0405410 A1 Dec. 30, 2021

(30) Foreign Application Priority Data
Jun. 29, 2020 (CN) .......................... 202010606467.6

(51) Int. Cl.
*G02F 1/1368* (2006.01)
*B60R 11/02* (2006.01)
*G02F 1/1362* (2006.01)
*G09G 3/34* (2006.01)

(52) U.S. Cl.
CPC ........ *G02F 1/1368* (2013.01); *B60R 11/0229* (2013.01); *B60R 11/0258* (2013.01); *B60R 11/0264* (2013.01); *G02F 1/136286* (2013.01); *G09G 3/3406* (2013.01)

(58) Field of Classification Search
CPC ................................................... G02F 1/1368
See application file for complete search history.

(56) References Cited

U.S. PATENT DOCUMENTS

| | | | | |
|---|---|---|---|---|
| 8,294,736 | B2 * | 10/2012 | Hirata | G09G 5/028 348/790 |
| 10,477,645 | B1 * | 11/2019 | Chen | G09G 5/10 |
| 2008/0157682 | A1 * | 7/2008 | Kwon | G01J 1/4204 250/206 |
| 2017/0285636 | A1 * | 10/2017 | Russell | G05D 1/0027 |

* cited by examiner

*Primary Examiner* — Sang V Nguyen
(74) *Attorney, Agent, or Firm* — Houtteman Law LLC

(57) ABSTRACT

The present disclosure provides a display substrate and a display device, belonging to the field of display technology, which can solve the problem that a splicing gap between existing adjacent display substrates of a spliced screen is relatively wide, and a narrow-bezel display cannot be realized. The display substrate of the present disclosure has a display area and a non-display area surrounding the display area; the display substrate includes a base and a plurality of pixel units located on the base and arranged in the display area; each of the pixel units includes a pixel circuit. The display substrate further includes: a light detection circuit located on the base and arranged in the non-display area; where the light detection circuit is configured to detect brightness of ambient light.

13 Claims, 2 Drawing Sheets

DISPLAY SUBSTRATE AND DISPLAY DEVICE

CROSS REFERENCE TO RELATED APPLICATIONS

The present application claims the priority to Chinese patent application No. 202010606467.6 filed at the Chinese Intellectual Property Office on Jun. 29, 2020, the contents of which is incorporated herein by reference in its entirety.

TECHNICAL FIELD

The disclosure relates to the field of display technology, and particularly relates to a display substrate and a display device.

BACKGROUND

The traditional in-vehicle display device can only display a picture with single brightness, and cannot adjust the brightness according to ambient light, so that the energy is wasted. In order to save energy, in-vehicle display devices capable of automatically adjusting brightness appear in the market at present, and in order to obtain a better display effect, the in-vehicle display devices gradually develop towards a dual-screen and a multi-screen formed by splicing a plurality of display panels.

SUMMARY

An embodiment of the present disclosure provides a display substrate having a display area and a non-display area surrounding the display area, where the display substrate includes: a base and a plurality of pixel units located on the base and in the display area; each of the pixel units includes a pixel circuit, the display substrate further includes a light detection circuit located on the base and in the non-display area; and the light detection circuit is configured to detect brightness of ambient light.

In some implementations, the light detection circuit includes a plurality of light detection sub-circuits; each of the light detection sub-circuits includes: a photosensitive thin film transistor, a first resistor, a light emitting diode and a storage capacitor, a control electrode of the photosensitive thin film transistor is coupled with a first terminal of the first resistor and a first electrode of the light emitting diode, a first electrode of the photosensitive thin film transistor is coupled with a data line, and a second electrode of the photosensitive thin film transistor is coupled with a current output terminal;

the first terminal of the first resistor is coupled with the control electrode of the photosensitive thin film transistor and the first electrode of the light emitting diode, and a second terminal of the first resistor is coupled with a second electrode of the light emitting diode and a first terminal of the storage capacitor;

the first electrode of the light emitting diode is coupled with the first terminal of the first resistor and the control electrode of the photosensitive thin film transistor, and the second electrode of the light emitting diode is coupled with the second terminal of the first resistor and the first terminal of the storage capacitor; and the first terminal of the storage capacitor is coupled with the second terminal of the first resistor and the second electrode of the light emitting diode, and a second terminal of the storage capacitor is coupled with a scan line.

In some implementations, the display substrate further includes: a light switch circuit located on the base and in the non-display area, where the light switch circuit includes: a photodiode, a switch thin film transistor, a second resistor and a third resistor;

a first electrode of the photodiode is coupled with a first power voltage terminal and a first terminal of the second resistor, and a second electrode of the photodiode is coupled with a control electrode of the switch thin film transistor and a first terminal of the third resistor;

the control electrode of the switch thin film transistor is coupled with the second electrode of the photodiode and the first terminal of the third resistor, a first electrode of the switch thin film transistor is coupled with the second terminal of the second resistor and a voltage output terminal, and a second electrode of the switch thin film transistor is coupled with a second power voltage terminal and a second terminal of the third resistor;

the first terminal of the second resistor is coupled with the first electrode of the photodiode and the first power voltage terminal, and the second terminal of the second resistor is coupled with the first electrode of the switch thin film transistor and the voltage output terminal; and the first terminal of the third resistor is coupled with the second electrode of the photodiode and the control electrode of the switch thin film transistor, and the second terminal of the third resistor is coupled with the second electrode of the switch thin film transistor and the second power voltage terminal.

In some implementations, each of the pixel circuits includes a pixel thin film transistor;

corresponding film layers of the pixel thin film transistor, the photosensitive thin film transistor and the switch thin film transistor are arranged in a same layer and made of a same material.

In some implementations, a width of a space between an area where the light detection circuit is located and the display area ranges from 0.7 mm to 1.0 mm.

An embodiment of the present disclosure provides a display device, including a plurality of display substrates described above.

In some implementations, the display device further includes at least one backlight module on a side of the base away from the pixel units, where the display substrates correspond to the same backlight module; or the display substrates correspond to the at least one backlight module one to one.

In some implementations, the display device further includes a light blocking layer located on a side of the pixel units away from the base, where in response to that the display substrates correspond to the same backlight module, only the photosensitive transistor in one of the display substrates is exposed, and photosensitive transistors in remaining ones of the display substrates are blocked by the light blocking layer.

In some implementations, the display device further includes a control circuit, where the control circuit is configured to adjust brightness of a light source provided by the backlight module according to the brightness of ambient light detected by the light detection circuit and a duration of changing of the brightness of ambient light.

In some implementations, each of the display substrates further includes: a light switch circuit located on the base and in the non-display area, and where the control circuit times a duration of changing of the brightness of ambient light according to a signal output by a voltage output terminal of the light switch circuit.

In some implementations, the display device includes an in-vehicle central controller and an in-vehicle navigator.

DRAWINGS

DETAILED DESCRIPTION

Figure 1:
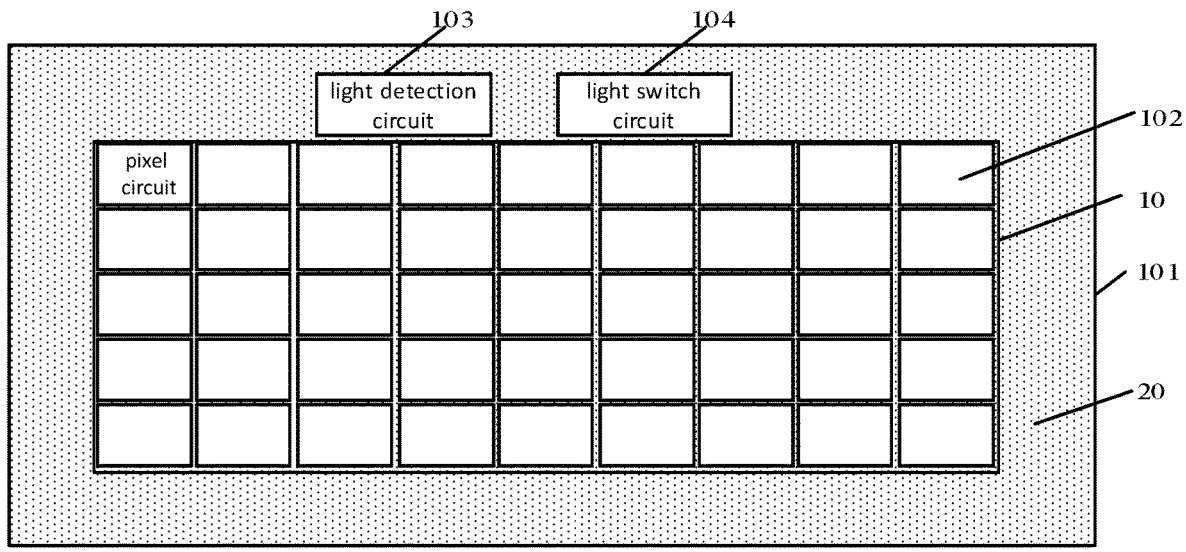
FIG. 1 is a schematic structural diagram of a display substrate according to an embodiment of the present disclosure.

In order that those skilled in the art will better understand the technical solutions of the present disclosure, the following detailed description is given with reference to the accompanying drawings and the specific embodiments.

Unless defined otherwise, technical or scientific terms used herein shall have the ordinary meaning as understood by one of ordinary skill in the art to which the present disclosure belongs. The use of "first", "second" and the like in the present disclosure is not intended to indicate any order, quantity, or importance, but rather is used to distinguish one element from another. Also, the use of the terms "a", "an" or "the" and similar referents does not denote a limitation of quantity, but rather denotes the presence of at least one. The word "include" or "comprise", and the like, is intended to mean that the element or item preceding the word contains the element or item listed after the word and its equivalent, but not the exclusion of other elements or items. The terms "coupled" or "coupled" and the like are not restricted to physical or mechanical connections, but may include electrical connections, whether direct or indirect. The positional relationship words "on" and the like are used merely to indicate relative positional relationships, which may change accordingly when an absolute position of the object being described changes.

It should be noted that the transistors used in the embodiments of the present disclosure may be thin film transistors or field effect transistors or other devices with the same characteristics, and since the source and the drain of the transistor used are symmetrical, the source and the drain thereof are not different. In the embodiments of the present disclosure, to distinguish the source and the drain of the transistor, one of them is referred to as a first electrode, the other electrode is referred to as a second electrode, and the gate is referred to as a control electrode. In addition, the transistors can be divided into N-type transistors and P-type transistors according to the characteristics of the transistors, and in the following embodiments, the N-type transistors are used for explanation, when the N-type transistors are used, the first electrode is the source of the N-type transistor, the second electrode is the drain of the N-type transistor, and when a high level is input to the gate, the source and the drain are electrically coupled (i.e., a current is allowed theirbetween), and for the P-type transistors, the opposite is true. It is contemplated that implementation with the P-type transistors will be readily apparent to one skilled in the art without creative effort and, thus, are within the scope of the disclosed embodiments. In the embodiment of the present disclosure, a first power voltage written into a first power voltage terminal is a positive voltage, a second power voltage written into a second power voltage terminal is a negative voltage, an example in which the first power voltage is a high power voltage, the second power voltage is a low power voltage, a first electrode of a light emitting diode is an anode, and a second electrode of the light emitting diode is a cathode is taken for illustrating.

For an in-vehicle multi-screen display device in the market, a photosensitive device is generally provided in a bezel of the display device by digging a hole, and in the multi-screen display device, positions for providing the photosensitive devices need to be considered for adjacent display panels, leading to a wide splicing gap between adjacent display panels, thus a narrow-bezel design is impossible. In addition, the light detection circuit of the photosensitive device in the current multi-screen display device is generally formed by coupling a plurality of photosensitive thin film transistors in parallel, but the on or off states of the photosensitive thin film transistors are easily inconsistent due to different on or off times of the photosensitive thin film transistors, so that the photosensitive thin film transistors are easily cracked. In a scene that the ambient light changes rapidly and frequently, the photosensitive device and the timing circuit need to be designed separately, and higher requirements are imposed on the response speed and the algorithm processing of the photosensitive device, so that the complexity and the design cost of the light detection circuit are increased.

FIG. 1 is a schematic structural diagram of a display substrate according to an embodiment of the present disclosure, and as shown in FIG. 1, the display substrate has a display area 10 and a non-display area 20 surrounding the display area 10; the display substrate includes: a base 101; and a plurality of pixel units 102 disposed on the base 101 and disposed in the display area 10; each of the pixel units 102 includes a pixel circuit; the display substrate further includes: a light detection circuit 103 disposed on the base 101 and disposed in the non-display area 20; the light detection circuit 103 is configured to detect the brightness of ambient light.

In the display substrate provided in the present embodiment, the pixel circuits of the pixel units 102 in the display area 10 may be coupled to scan lines and data lines, the pixel circuits operate under the driving of scan signals provided by the scan lines, and data voltages of different gray scales input by the data lines are input to pixel electrodes in the pixel circuits, and liquid crystal molecules in the pixel units 102 may be deflected under the control of a common voltage on a common electrode and the data voltages on the pixel electrodes, so as to change the deflection angle of the liquid crystal molecules, and implement the display of different display brightness of the pixel units 102. The light detection circuit 103 in the non-display area 20 may be configured to detect the brightness of the ambient light, and to adjust, when a change in the brightness of the ambient light is detected, the display brightness of the pixel units 102 in the display substrate through an external control circuit, so that the display brightness of the pixel units 102 are coordinated with the brightness of the ambient light, thereby improving the display effect and further improving the user's experience. In the embodiment of the present disclosure, the light detection circuit 103 may be directly fabricated on the base 101 of the display substrate, and the light detection circuit 103 may be fabricated at the same time as the fabrication of the pixel circuits of the display substrate to achieve the integration of the light detection circuit 103, so that it is not necessary to place the photosensitive device in the display substrate by digging hole after the fabrication of the display substrate is completed, and thus a width of the bezel of the display substrate may be reduced, and further a narrow-bezel display device can be achieved. In the related art, when a plurality of display substrates need to be spliced to form a large-sized display device, because the positions of the photosensitive devices need to be arranged and considered, the splicing gap between the adjacent display substrates is generally about 40 millimeters (mm), so that the splicing gap is relatively wide, and the display effect is influenced. Compared with the display substrates in the related art, the light detection circuit 103 in the display substrate provided by the present embodiment is only in the micron-sized width, so that the space utilization rate of the display substrate can be improved, and the influence of the light detection circuit 103 on the splicing gap between the adjacent display substrates does not need to be considered, so that the splicing gap between the adjacent display substrates can be reduced, the splicing of the display substrates can be realized with ultra-narrow splicing gaps therebetween, and the use experience of a user can be improved.

Figure 2:
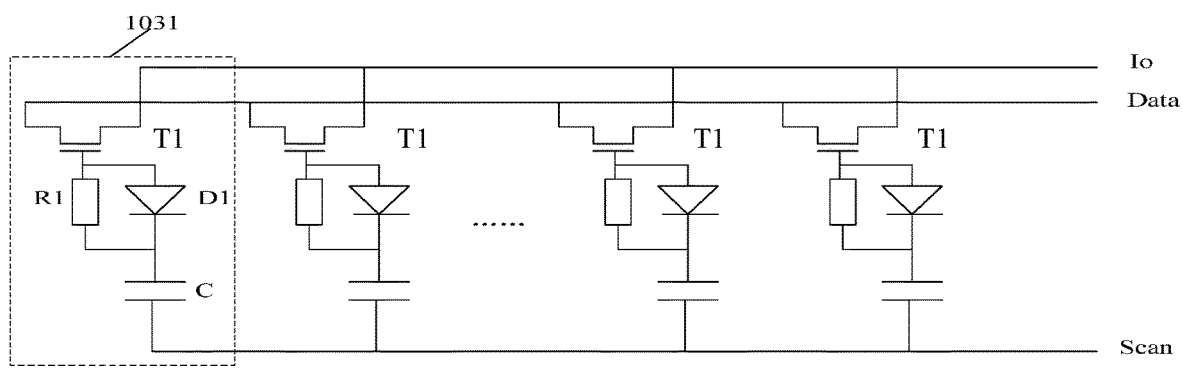
FIG. 2 is a schematic structural diagram of a light detection circuit according to an embodiment of the present disclosure.

FIG. 2 is a schematic structural diagram of a light detection circuit according to an embodiment of the present disclosure, and as shown in FIG. 2, the light detection circuit 103 includes a plurality of light detection sub-circuits 1031; each of the light detection sub-circuits 1031 includes: a photosensitive thin film transistor T1, a first resistor R1, a light emitting diode D1 and a storage capacitor C; a gate of the photosensitive thin film transistor T1 is coupled with a first terminal of the first resistor R1 and an anode of the light-emitting diode D1, a source of the photosensitive thin film transistor T1 is coupled with the data line Data, and a drain of the photosensitive thin film transistor T1 is coupled with a current output terminal Io; the first terminal of the first resistor R1 is coupled with the gate of the photosensitive thin film transistor T1 and the anode of the light emitting diode D1, and a second terminal of first resistor R1 is coupled with a cathode of the light emitting diode D1 and a first terminal of the storage capacitor C; the anode of the light-emitting diode D1 is coupled with the first terminal of the first resistor R1 and the gate of the photosensitive thin film transistor T1, and the cathode of the light-emitting diode D1 is coupled with the second terminal of the first resistor R1 and the first terminal of the storage capacitor C; the first terminal of the storage capacitor C is coupled to the second terminal of the first resistor R1 and the cathode of the light emitting diode D1, and the second terminal of the storage capacitor C is coupled to a scan line Scan.

It should be noted that, the plurality of light detection sub-circuits 1031 in the light detection circuit 103 are arranged in parallel, when the gate of the photosensitive thin film transistor T1 in each light detection sub-circuit 1031 is input with a high level signal, the source and the drain of the photosensitive thin film transistor T1 may be conductive to allow a current passing therethrough, and the current is output through the current output terminal Io, the output current varies with the ambient light, and different light signals may be converted into different current signals, thereby implementing the function of detecting the brightness of the ambient light. The plurality of light detection sub-circuits 1031 being coupled in parallel can improve the sensitivity of detecting the brightness of the ambient light and improve detection efficiency. When the gate of the photosensitive thin film transistor T1 is input with a high level signal, the photosensitive thin film transistor T1 can be turned on instantly, and the voltage stored by the storage capacitor C remains unchanged; when the gate of the photosensitive thin film transistor T1 is input with a low level signal, the capacitance stored by the storage capacitor C remains unchanged, and the photosensitive thin film transistor T1 can quickly enter a cut-off region, so that the turn-on and turn-off of the photosensitive thin film transistor T1 can be accelerated, the response time of the photosensitive thin film transistor T1 can be shortened, and the sensitivity of the photosensitive thin film transistor T1 can be improved. In practical applications, the light emitting diode D1 with a lower turn-on voltage than that of the photosensitive thin film transistor T1 may be selected, for example, the turn-on voltage of the photosensitive thin film transistor T1 may be selected to be about 0.7V, and the light emitting diode with a turn-on voltage of 0.4V may be selected at the same time, so that the source or the drain of the photosensitive thin film transistor T1 may be limited to be at about 0.4V, and a storage time of the photosensitive thin film transistor T1 from a saturation state to a critical state of 0V bias voltage may be shortened. It can be seen that the response time of the photosensitive thin film transistor T1 in each light detection sub-circuit 1031 in the display substrate provided by the present embodiment is relatively short, and the photosensitive thin film transistor T1 can be effectively prevented from staying at a negative temperature coefficient for a long time, so that a fact that the photosensitive thin film transistor T1 is cracked to affect the sensitivity of detecting the brightness of the ambient light can be avoided.

Figure 3:
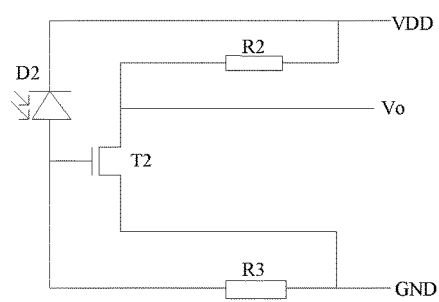
FIG. 3 is a schematic structural diagram of a light switch circuit according to an embodiment of the present disclosure.
Figure 4:
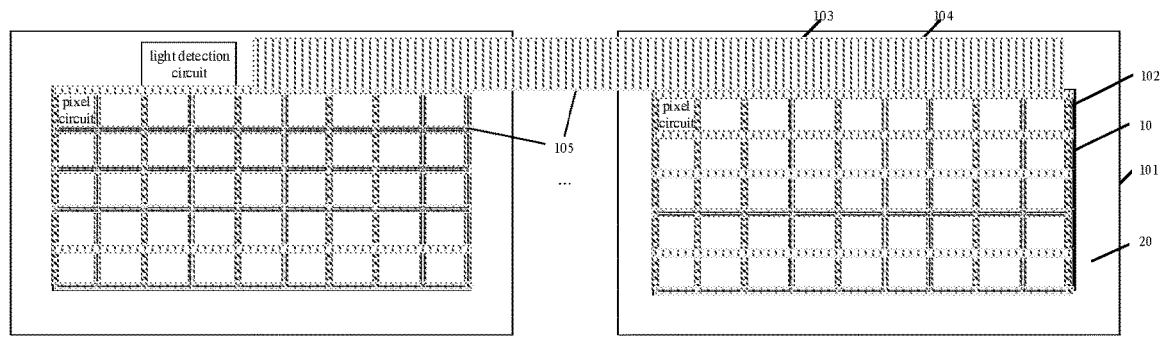
FIG. 4 is a schematic structural diagram of a display device according to an embodiment of the present disclosure.
Figure 5:
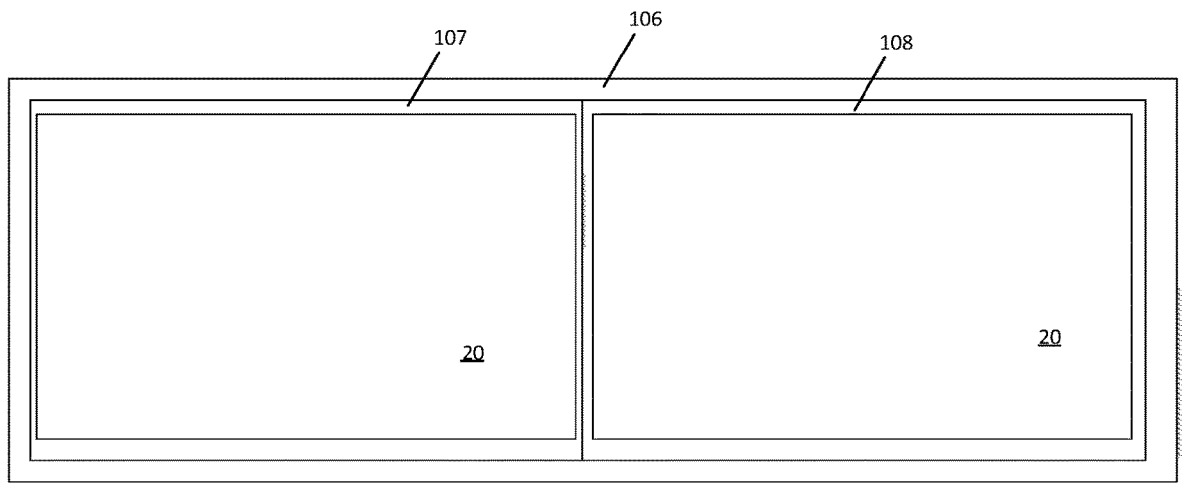
FIG. 5 is a schematic structural diagram of a display device according to an embodiment of the present disclosure.

In some implementations, as shown in FIG. 1, the display substrate further includes a light switch circuit 104 disposed on the base 101 and disposed in the non-display area 20. FIG. 3 is a schematic structural diagram of a light switch circuit according to an embodiment of the present disclosure, and as shown in FIG. 3, the light switch circuit 104 includes: a photodiode D2, a switch thin film transistor T2, a second resistor R2 and a third resistor R3; an anode of the photodiode D2 is coupled to a first power voltage terminal VDD and a first terminal of the second resistor R2, and a cathode of the photodiode D2 is coupled to a gate of the switch thin film transistor T2 and a first terminal of the third resistor R3; the gate of the switch thin film transistor T2 is coupled to the cathode of the photodiode D2 and a first terminal of the third resistor R3, a source of the switch thin film transistor T2 is coupled with a second terminal of the second resistor R2 and a voltage output terminal Vo, and a drain of the switch thin film transistor T2 is coupled with a second power voltage terminal GND and a second terminal of the third resistor R3; the first terminal of the second resistor R2 is coupled with the anode of the photodiode D2 and the first power voltage terminal VDD, and the second terminal of the second resistor R2 is coupled with the source of the switch thin film transistor T2 and the voltage output terminal Vo; the first terminal of the third resistor R3 is coupled to the cathode of the photodiode D2 and the gate of the switch thin film transistor T2, and the second terminal of the third resistor R3 is coupled to the drain of the switch thin film transistor T2 and the second power voltage terminal GND.

It should be noted that when the ambient light irradiates the photodiode D2, the photodiode D2 may be turned on, and a high level of the first power voltage terminal VDD may be inputted to the gate of the switch thin film transistor T2, and the switch thin film transistor T2 is turned on. When no ambient light irradiates the photodiode D2, the photodiode D is not turned on, the gate of the switch thin film transistor T2 is coupled to the second power voltage terminal GND and is at a low level, and the switch thin film transistor T2 is turned off. Time data is transmitted to a register for timing according to the turn-on and turn-off states of the switch thin film transistor T2. It should be noted that the register may be disposed in an external control circuit, and may include a pre-stored brightness level register RL, a brightness level abrupt change timer Rt, and a brightness level switching timer Rt. Each light detection sub-circuit 1031 can detect and collect the brightness of the ambient light in real time, and divide the brightness of the ambient light into different levels, and store the levels in the pre-stored brightness level register RL. The brightness level abrupt change timer Rt may determine whether the brightness of the ambient light is abruptly changed according to the brightness of the ambient light detected and collected in real time by the light detection sub-circuit 1031. The brightness level switching timer RT can determine a steady change of the brightness of the ambient light, so that the brightness of the pixel units 102 is smoothly switched to new brightness. Specifically, the light switch circuit 104 may output a corresponding voltage signal Vo according to the presence or absence of the ambient light. When the voltage signal Vo is at a low level, an external timing circuit is turned off, and when the voltage signal Vo is at a high level, the external timing circuit is turned on and starts timing. In a specific example, the brightness levels may be divided into L0, L1, and L2 . . . Ln, where the brightness corresponding to the levels may be 0-0.1 klux, 0.1-0.2 klux, and 0.2-0.3 klux . . . , respectively. Initially detected brightness of the ambient light is 0.05 klux, which corresponds to the brightness level L0, the next detected brightness of the ambient light is 0.15 klux, which corresponds to the brightness level L1, and a duration of the change may be counted as t, for example, if the duration t of the change of the brightness of the ambient light between two brightness levels is less than one minute, it is judged that the brightness level is abruptly changed. And if the duration t of the change of the brightness of the ambient light between the two brightness levels is more than one minute, it is judged that the brightness level is not abruptly changed. When the brightness level is abruptly changed, the external control circuit can control the pixel units 102 to keep the current brightness unchanged, so that the visual fatigue of a user caused by frequent brightness switching can be avoided, and the user's experience is not influenced. When the brightness level is not abruptly changed, the display brightness of the pixel units 102 in the display substrate can be adjusted through the external control circuit, so that the display brightness of the pixel units 102 is coordinated with the brightness of the ambient light, and the display effect can be improved.

In some implementations, the pixel circuit includes a pixel thin film transistor, corresponding film layers of the pixel thin film transistor, the photosensitive thin film transistor T1 and the switch thin film transistor T2 are arranged in a same layer, and are made of a same material, respectively.

It should be noted that the pixel thin film transistor in the pixel circuit may be a driving transistor or a switch transistor, and the driving transistor will be described as an example in the embodiment of the present disclosure. A gate of the pixel thin film transistor in the pixel circuit may be coupled to the scan line Scan, a source of the pixel thin film transistor may be coupled to the data line Data, a drain of the pixel thin film transistor may be coupled to a pixel electrode, and a data voltage may be input to the pixel electrode under the control of a scan signal, and the liquid crystal molecules in the pixel unit 102 may be deflected under the control of a common voltage on the common electrode and the data voltage on the pixel electrode, so as to change the deflection angle of the liquid crystal molecules and achieve the display of the pixel units 102 with the display brightness. In practical applications, the pixel thin film transistor, the photosensitive thin film transistor T1, and the switch thin film transistor T2 may all be transistors of a same type, for example, they may all be bottom gate transistors, each of the transistors includes a gate, a gate insulating layer, an active layer, an interlayer insulating layer, a source, and a drain, which are sequentially disposed on the base 101, where the source and the drain are disposed in a same layer, and are respectively coupled to two terminals of the active layer through via holes penetrating through the interlayer insulating layer. In the manufacturing process, the corresponding film layers of the pixel thin film transistor, the photosensitive thin film transistor T1 and the switch thin film transistor T2 may be prepared by a same process and a same material, so that the manufacturing process of the display substrate can be simplified, and the manufacturing cost is saved. Meanwhile, the light detection circuit 103 can be integrated in the manufacturing process of the display substrate, so that the width of the bezel of the display substrate can be reduced, and a narrow-bezel display can be realized.

In some implementations, the light detection circuit 103 is spaced from the display area 20 by a width ranging from 0.7 mm to 1.0 mm.

It should be noted that the light detection circuit 103 may be located in the non-display area 20, and an electrostatic ring and various signal lines need to be disposed between the light detection circuit 103 and the display area 20, so that the light detection circuit 103 needs to be disposed within a certain width range from the display area 20 to avoid interference of the light detection circuit 103 on signal wirings in the display area 20. In practical applications, a polarizer needs to be covered on the display substrate, and a width of the polarizer exceeding the display area 10 is about 1 mm, so as to prevent light leakage caused by the expansion and contraction of the polarizer in high and low temperature environments. There is a certain width between an ink area on a cover plate and the display area 10, if a distance from the light detection circuit 103 to the display area 10 is too large, it is easy to cause the ink disuniformity of the whole module, if the light detection circuit 103 is close to the display area, in order to meet the detection of the brightness of the ambient light, the ink area cannot cover a region where the light detection circuit 103 is located, otherwise the brightness of the ambient light cannot be accurately detected. In a case of high temperature, considering the electron mobility characteristics and large-current driving of the photosensitive thin film transistor T1, it is required to increase the aspect ratio of the photosensitive thin film transistor T1. In consideration of the above-described various factors, in the display substrate in the embodiment of the present disclosure, the width of a space between a region where the light detection circuit 103 is located and the display area 20 ranges from 0.7 mm to 1.0 mm. In some implementations, the width of the space between the region where the light detection circuit 103 is located and the display area 20 is 0.7 mm, which is in the reasonable reservation range of the polarizer, and the interference of wirings in the display area 10 is avoided as well, in addition, the distance of 0.7 mm has no obvious influence on the visual difference, so that the narrow-bezel display effect can be realized.

An embodiment of the present disclosure provides a display device including the display substrate provided in the above embodiment. The implementation principle of the display device 106 is similar to that of the display substrate provided in the above embodiments, and is not repeated herein.

In some implementations, the display device 106 further includes a backlight module located on a side of the base away from the pixel units; a plurality of display substrates correspond to a same backlight module; or each display substrate corresponds to one backlight module.

It should be noted that, in practical applications, the display substrate in the display device 106 may be provided with a light source by the backlight module on the back of the display device 106, so as to implement a display function. The plurality of display substrates in the display device may be spliced to form a large-sized display, where the plurality of display substrates may correspond to a same backlight module, so that the manufacturing process of the backlight module can be simplified, and the brightness of the light source provided by the backlight module can be controlled during brightness adjustment, so that the brightness of the whole display device is controlled. Alternatively, each display substrate may correspond to one backlight module, so that each display substrate can be provided with a light source by an independent backlight module, and when the brightness is adjusted, the brightness of each display substrate can be controlled by controlling the brightness of the light source provided by the corresponding independent backlight module, so that the brightness adjustment is more accurate, and further a partition brightness adjustment can be realized.

In some implementations, the display device further includes a light blocking layer 105 located on a side of the pixel units away from the base; when the display substrates correspond to a same backlight module, only the photosensitive transistor in one of the display substrates is exposed, and the photosensitive transistors in the rest display substrates are blocked by the light blocking layer 105.

It should be noted that, the light blocking layer 105 can block light between adjacent pixel units in the display substrate, so that color crosstalk between pixel units of different colors can be prevented, and light leakage from the display substrate can be prevented. When the plurality of display substrates correspond to a same backlight module, only one or a portion of the light detection circuits in the display substrates are needed to detect the brightness of the ambient light, so that the light blocking layer can be utilized to block the light detection circuits in the display substrates which do not need to detect the brightness of the ambient light in the manufacturing process, thus the display substrates do not need to be redesigned, and the manufacturing cost can be saved.

In some implementations, the display device 106 further includes a control circuit, the control circuit is configured to adjust the brightness of the light source provided by the backlight module according to the brightness of the ambient light detected by the light detection circuit and the duration of the change of the brightness.

It should be noted that adjusting the brightness of the pixel units in the display substrate may be implemented by adjusting the brightness of the light source provided by the backlight module, where the control circuit may be a backlight control circuit.

In some implementations, the display device 106 includes an in-vehicle central controller 107 or an in-vehicle navigator 108.

It should be noted that, the display device 106 may be an in-vehicle display product, and specifically may be a multi-screen display product formed by splicing an in-vehicle central controller 107 and an in-vehicle navigator 108, and when the brightness of the ambient light changes, the adjustment of the display brightness of the in-vehicle central controller and the in-vehicle navigator can be realized, so that the display effect is improved. When the brightness of the ambient light is switched rapidly and frequently, the current display brightness of the in-vehicle central controller and the in-vehicle navigator can be kept unchanged, so that visual fatigue of a user caused by frequent switching of the display brightness can be avoided, and the use's experience can be improved.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

The invention claimed is:

1. A display substrate, having a display area and a non-display area surrounding the display area, wherein the display substrate comprises: a base and a plurality of pixel units located on the base and in the display area; each of the pixel units comprises a pixel circuit, and the display substrate further comprises a light detection circuit located on the base and in the non-display area; and wherein the light detection circuit is configured to detect brightness of ambient light, wherein the light detection circuit comprises a plurality of light detection sub-circuits, each of the light detection sub-circuits comprises: a photosensitive thin film transistor, a first resistor, a light emitting diode and a storage capacitor, and wherein a control electrode of the photosensitive think film transistor is coupled with a first terminal of the first resistor and a first electrode of the light emitting diode, a first electrode of the photosensitive thin film transistor is coupled with a data line, and a second electrode of the photosensitive thin film transistor is coupled with a current output terminal;

the first terminal of the first resistor is coupled with the control electrode of the photosensitive thin film transistor and the first electrode of the first emitting diode, and a second terminal of the first resistor is coupled with a second electrode of the light emitting diode and a first terminal of the storage capacitor, the first electrode of the light emitting diode is coupled with the first terminal of the first resistor and the control electrode of the photosensitive thin film transistor, and the second electrode of the light emitting diode coupled with the second terminal of the first resistor and the first terminal of the storage capacitor; and the first terminal of the storage capacitor is coupled with the second terminal of the first resistor and the second electrode of the light emitting diode, and a second terminal of the storage capacitor is coupled with a scan line.

2. The display substrate of claim 1, further comprising: a light switch circuit located on the base and in the non-display area, wherein
the light switch circuit comprises: a photodiode, a switch thin film transistor, a second resistor and a third resistor;
a first electrode of the photodiode is coupled with a first power voltage terminal and a first terminal of the second resistor, and a second electrode of the photodiode is coupled with a control electrode of the switch thin film transistor and a first terminal of the third resistor;
the control electrode of the switch thin film transistor is coupled with the second electrode of the photodiode and the first terminal of the third resistor, a first electrode of the switch thin film transistor is coupled with a second terminal of the second resistor and a voltage output terminal, and a second electrode of the switch thin film transistor is coupled with a second power voltage terminal and a second terminal of the third resistor;
the first terminal of the second resistor is coupled with the first electrode of the photodiode and the first power voltage terminal, and the second terminal of the second resistor is coupled with the first electrode of the switch thin film transistor and the voltage output terminal; and
the first terminal of the third resistor is coupled with the second electrode of the photodiode and the control electrode of the switch thin film transistor, and the second terminal of the third resistor is coupled with the second electrode of the switch thin film transistor and the second power voltage terminal.

3. The display substrate of claim 2, wherein each of the pixel circuits comprises a pixel thin film transistor;
corresponding film layers of the pixel thin film transistor, the photosensitive thin film transistor and the switch thin film transistor are arranged in a same layer and made of a same material.

4. The display substrate of claim 1, wherein a width of a space between an area where the light detection circuit is located and the display area ranges from 0.7 mm to 1.0 mm.

5. A display device, comprising a plurality of display substrates, each of which is the display substrate according to claim 1.

6. The display device of claim 5, further comprising at least one backlight module on a side of the base away from the pixel units, wherein
the display substrates correspond to a same backlight module; or each of the display substrates corresponds to one backlight module.

7. The display device of claim 6, further comprises a light blocking layer located on a side of the pixel units away from the base, wherein
in response to that the display substrates correspond to the same backlight module, only the photosensitive transistor in one of the display substrates is exposed, and photosensitive transistors in remaining ones of the display substrates are blocked by the light blocking layer.

8. The display device of claim 6, further comprising: a control circuit, wherein
the control circuit is configured to adjust brightness of a light source provided by the backlight module according to the brightness of ambient light detected by the light detection circuit and a duration of changing of the brightness of ambient light.

9. The display device of claim 8, wherein each of the display substrates further comprises: a light switch circuit located on the base and in the non-display area, and wherein
the control circuit times a duration that the brightness of ambient light changes according to a signal output by a voltage output terminal of the light switch circuit.

10. The display device of claim 9, wherein the light switch circuit comprises: a photodiode, a switch thin film transistor, a second resistor and a third resistor;
a first electrode of the photodiode is coupled with a first power voltage terminal and a first terminal of the second resistor, and a second electrode of the photodiode is coupled with a control electrode of the switch thin film transistor and a first terminal of the third resistor;
the control electrode of the switch thin film transistor is coupled with the second electrode of the photodiode and the first terminal of the third resistor, a first electrode of the switch thin film transistor is coupled with a second terminal of the second resistor and a voltage output terminal, and a second electrode of the switch thin film transistor is coupled with a second power voltage terminal and a second terminal of the third resistor;
the first terminal of the second resistor is coupled with the first electrode of the photodiode and the first power voltage terminal, and the second terminal of the second resistor is coupled with the first electrode of the switch thin film transistor and the voltage output terminal; and
the first terminal of the third resistor is coupled with the second electrode of the photodiode and the control electrode of the switch thin film transistor, and the second terminal of the third resistor is coupled with the second electrode of the switch thin film transistor and the second power voltage terminal.

11. The display device of claim 10, wherein the pixel circuit comprises a pixel thin film transistor, wherein
corresponding film layers of the pixel thin film transistor, the photosensitive thin film transistor and the switch thin film transistor are arranged in a same layer and made of a same material.

12. The display device according to claim 8, wherein a width of a space between an area where the light detection circuit is located and the display area ranges from 0.7 mm to 1.0 mm.

13. The display device of claim 5, wherein the display device comprises an in-vehicle central controller and an in-vehicle navigator.

* * * * *